US006721408B1

United States Patent
Bain et al.

(10) Patent No.: US 6,721,408 B1
(45) Date of Patent: Apr. 13, 2004

(54) METHOD AND APPARATUS FOR RECORDING OR FORWARDING MESSAGES

(75) Inventors: Lynda L. Bain, Boulder, CO (US); Mark Maize, Westminister, CO (US); Delbert D. Steinke, Northglenn, CO (US)

(73) Assignee: Qwest Communication International Inc., Denver, CO (US)

( * ) Notice: Subject to any disclaimer, the term of this patent is extended or adjusted under 35 U.S.C. 154(b) by 0 days.

(21) Appl. No.: 09/316,341

(22) Filed: May 21, 1999

(51) Int. Cl.[7] .......................... H04M 1/64; H04M 11/04; H04M 1/00
(52) U.S. Cl. .......................... 379/159; 379/37; 379/40; 379/67.1; 379/70; 379/157; 379/160; 379/161
(58) Field of Search .................. 379/34, 37, 40, 379/48, 49, 51, 67.1, 70, 100.05, 156, 157, 159, 160, 161, 164, 165, 167, 168, 170, 171–173

(56) References Cited

U.S. PATENT DOCUMENTS

| 4,554,411 | A | * | 11/1985 | Armstrong | 379/102.06 |
|---|---|---|---|---|---|
| 4,715,060 | A | | 12/1987 | Lipscher et al. | 379/70 |
| 5,148,468 | A | * | 9/1992 | Marrick et al. | 379/56 |
| 5,303,300 | A | * | 4/1994 | Eckstein | 379/103 |
| 5,357,562 | A | * | 10/1994 | Metser et al. | 379/67.1 |
| 5,598,456 | A | * | 1/1997 | Feinberg | 379/42 |
| 5,604,791 | A | * | 2/1997 | Lee | 379/67 |
| 5,774,039 | A | * | 6/1998 | Housley | 340/326 |
| 5,784,446 | A | * | 7/1998 | Stuart | 379/167 |
| 5,802,467 | A | * | 9/1998 | Salazar et al. | 455/420 |
| 6,097,288 | A | * | 8/2000 | Koeppe, Jr. | 340/517 |
| 6,233,328 | B1 | * | 5/2001 | Wolf | 379/159 |
| 6,324,261 | B1 | * | 11/2001 | Merte | 379/68 |
| 6,370,371 | B1 | * | 4/2002 | Sorrells et al. | 455/323 |

* cited by examiner

Primary Examiner—Allan Hoosain
(74) Attorney, Agent, or Firm—Townsend and Townsend and Crew LLP

(57) ABSTRACT

A system and method provide the capability for a visitor to a home or business to leave an audio message for the occupants if they are not present. Outside the home or building, an interface may be provided which is proximate to a doorbell which a visitor may employ when notification by the doorbell has proved unsuccessful. Actuation of a switch on the interface may activate a messaging system which will retrieve a stored phone number and establish a telephonic connection over a telephone network. The telephonic connection may be with a voice messaging system which, in turn, will broadcast via a speaker incorporated into the user interface, a greeting recorded by the occupant. At the end of the greeting, a visitor may then speak into a microphone incorporated into the user interface, and record an audio message. The controller may further be programmed to establish a telephonic connection remotely located between the visitor interface and a telephone. Through use of the components incorporated into the visitor interface, a two-way line of communication may be established between the visitor who is at the home or business and the occupant who may be remotely located.

27 Claims, 7 Drawing Sheets

METHOD AND APPARATUS FOR RECORDING OR FORWARDING MESSAGES

FIELD OF THE INVENTION

The invention described herein relates to a method and apparatus for recording or forwarding messages from visitors who physically visit a residence or building, and more particularly to an enhancement to a doorbell system which allows a visitor to leave an audio message if the resident or occupant is not present or willing to answer the door.

BACKGROUND OF THE INVENTION

Many different modes exist which people may employ to communicate amongst themselves. These modes include telephonic communications, e-mail, fax, electronic pages, or even the written letter. With regards to telephonic communications, certain enhancements may be provided such as voice messaging systems which allow a party who is calling another to leave a recorded audio message if the person they are calling does not answer. These voice messaging systems may be located with the telephone or may be part of a telephone network.

In the event that a person wishes to physically visit a home or building, these structures are usually equipped with some sort of signaling device, such as a doorbell, to notify the resident or occupant that someone is outside. If after employing the doorbell, it is apparent that the resident or occupant is not currently in the home or building, or chooses not to answer the door, it may be desirable to provide some sort of notification that they had paid a visit. If the visiting party is not carrying a pen and paper, there may not be any way to tell the resident or occupant that they had indeed visited.

SUMMARY OF THE INVENTION

The inventor has recognized that certain characteristics of voicemail systems which currently exist may be employed in order to provide a messaging system for visitors to a home or building. Further, the inventor has recognized that a system may be provided which allows a visitor to contact the resident or occupant of the building through forwarding technology incorporated into telephone systems.

Described herein is a system and method for storing or directing audio messages received from parties who physically visit a home, building or business. Included in the system may be a visitor interface which includes user actuated switches. These switches may be employed to establish and terminate an audio connection. Also included in the user interface may be the speaker for broadcasting audio information, a microphone for receiving audio messages from the visitor, or an indicator light which indicates whether the system is turned off or the telephone line is busy.

In connection with the visitor interface may be a message processing system which includes a controller device that detects activation of the switches on the interface and processes audio signals transmitted to and from the interface. The controller may also be in connection with a telephonic switch through which a connection may be established over a telephone network. A connection between the interface and the controller may be established through direct electrical means or through the use of wireless signals. The controller may include the functionality to dial a pre-programmed number and provide for the transmission and record of audio signals between the interface and a destination telephone number.

In operation, a visitor to a home, building, or business depresses a notification device such a doorbell to provide notice of their presence. If there is no response, to the doorbell, and the indicator light indicates that the system is operational, the visitor may then actuate a switch located on the interface in order to activate the voice messaging system. Upon activation, the controller may dial a preprogrammed telephone number and establish a telephonic connection with a preferred destination. Once this connection is established, the visitor will be notified and then may speak through the microphone 64 which transmits the audio message via the telephonic connection to the desired destination. When a visitor has completed the audio message, another switch may be actuated in order to terminate the telephonic connection.

In one aspect of the invention, a voice messaging system for the home, building, or business may be the desired destination. In order to reach a remotely located voice messaging system, the number programed into the controller and used to establish a telephonic connection, may be the telephone number for the physical location of the building or home. As is typical procedure for the operation of a voice messaging system, if a user of a telephone dials the number for the connection which they are using, a busy signal may be detected. In the situations where a voice messaging system is employed, a detected busy signal will automatically route the incoming telephone call to the voice messaging system. In accordance with the present invention, at this point, the visitor would then be able to leave a audio message on the occupant's voice messaging system.

In another aspect of the invention, a programmable interface in connection with the controller provides the ability to program different telephone numbers into the messaging system and to activate and deactivate the system. A system user may be able to program a forwarding number into the system such that when a visitor activates the system, the forwarding number is dialed and two-way communication can be established between the occupant, who is currently away, and the visitor.

In another aspect of the invention, the communications system may act as an extension on a telephone line which includes other telephones. All of the telephones including the messaging system may be tied into a switch for the building and as such when the visitor is leaving the message, an outgoing connection is not possible. The indicator on the visitor interface may indicate this.

In yet another aspect of the invention, all of the telephones in the building are connected through the visitor messaging system which is, in turn, connected to the telephone network. All incoming and outgoing audio communications are routed through the messaging system. Further incorporated into the messaging system is an intercom module which provides for the direct communication between the user interface and any of the telephones on the same telephone line. The intercom system may further include the call waiting functionality which provides notification to a telephone already in use that a visitor wishes to establish audio communications.

A direct line of communication may also be established between the visitor and the occupant through use of a separate telephone line for the doorbell system. Upon activation, the visitor may call the telephone line of the building and if the call is not answered it may be forwarded, like any other call received, to a voice message system or a forwarding number. If an answering machine is employed, this may be used to pick up a call and record a message.

DESCRIPTION OF THE PREFERRED EMBODIMENTS

Figure 1:
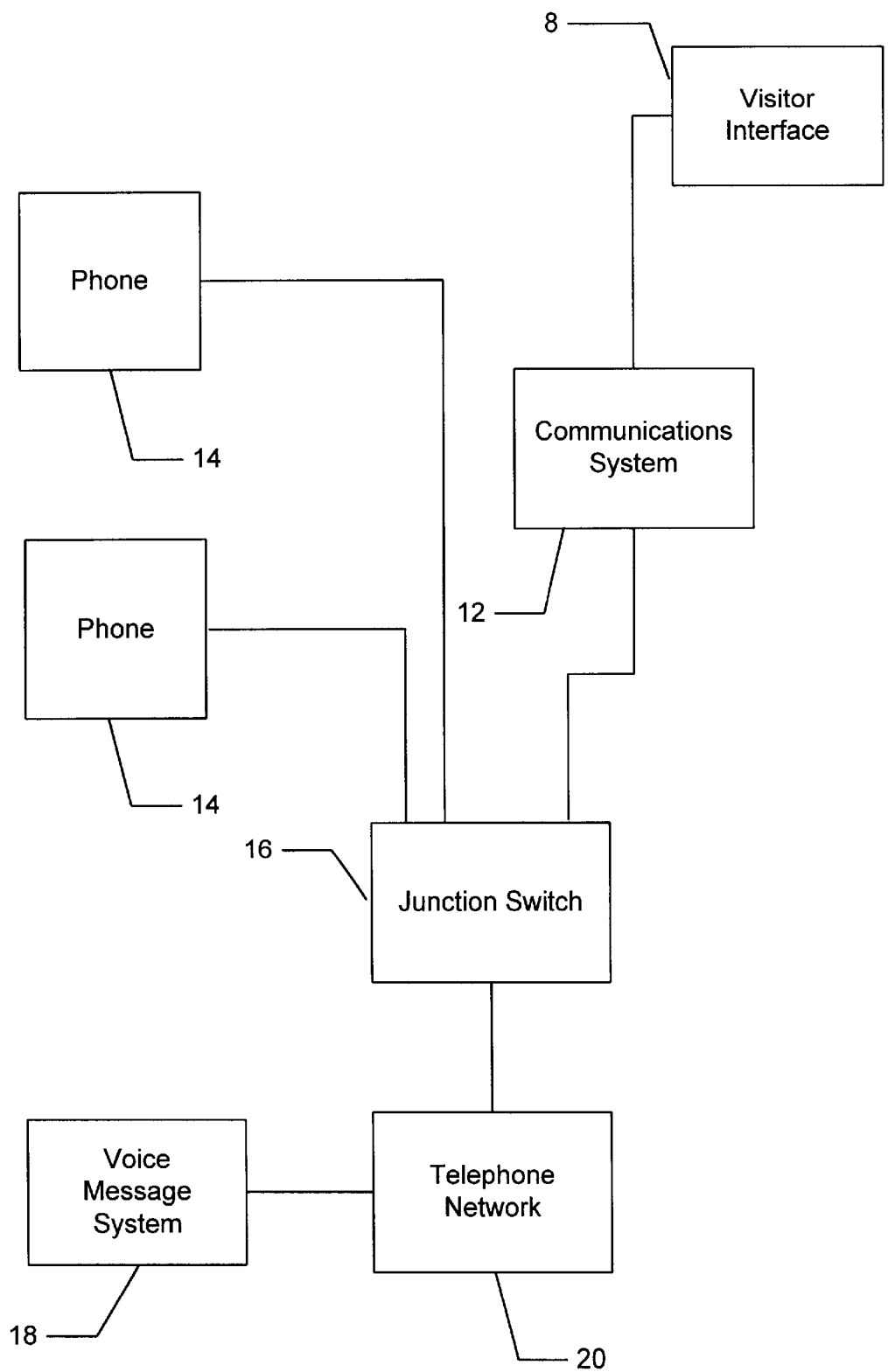
FIG. 1 discloses the connections established between the user interface, the visitor messaging system and the telephone network.

Disclosed in FIG. 1 is a diagram for a visitor messaging system. Visitor interface 8 is a self contained device which provides the means for a visiting party who wishes to leave an audio message for the occupant of a home, business, or building. As will be described in greater detail below, the visitor interface includes various interactive devices so that visitors may activate and use the system to either communicate with or provide an audio message for the occupant.

In connection with the visitor interface 8 is the communications system 12. The communications systems 12 provides for the establishment of a telephonic connection between the visitor interface and a destination on the telephone network. The communications system responds to various commands entered through the visitor interface 8 and processes the audio communications once the telephonic connection is established.

The communications system and the connection between the communications system and the interface may be implemented in a number of different ways. For example, the communications system may be a stand alone device or may be incorporated into a home control system. There currently exists a number of home control systems which centralize the control of everything from telephone connections to temperature control. The operation of the interface device may be one more function added to a centralized home control system.

With regards to the line of communications between the devices, a number of different modes may be employed. One mode is a hard electrical connection running from the interface to the control system. Another mode is a wireless connection in which the control system acts as a base station which receives and transmits radio signals to remotely located components. Yet another mode of communications may be through electrical system of the building. Certain systems are currently available (such as the X-10 system) which provide for the transmission and receipt of data signals over the electrical power lines in a building.

The communications system 12 includes the functionality to go off hook and dial a preprogrammed telephone number. In the embodiment of the invention disclosed in FIG. 1, the communications systems is connected to a single telephone line and acts as an extension along with the other telephones connected to the same telephone line. All of the extensions are routed through junction switch 16. The junction switch 16 provides a connection to the telephone network and depending on the number dialed, a connection may be established with the voice messaging system 18.

The system described herein provides the functionality for a visitor to a home or building to leave a message for the occupant if efforts to notify the occupant through use of devices such as a doorbell fail. Currently, if the occupant is not located in the building or chooses not to respond to the notifications of the visitor, the visitor may have no way to inform the occupant that they had tried to reach them. Not all visitors may be carrying a pen and paper in order to leave a note. Through use of system described herein, the visitor may activate a voice messaging system, which may be any of the voice messaging systems which are currently provided by telephone companies for their customers.

As is well known, voice messaging systems provide the capability to receive and record telephone messages without the necessity of having an answering machine within a home or building. All unanswered calls are forwarded to a remote location on the telephone network, where recording devices will answer and record messages. In most cases, after the call is forwarded, a prerecorded message is played and the caller may leave a message for the telephone user. It is also known that in the situations where the telephone is in use and a caller would otherwise get a busy signal, the call will be forwarded after a minimum number of rings.

Figure 2:
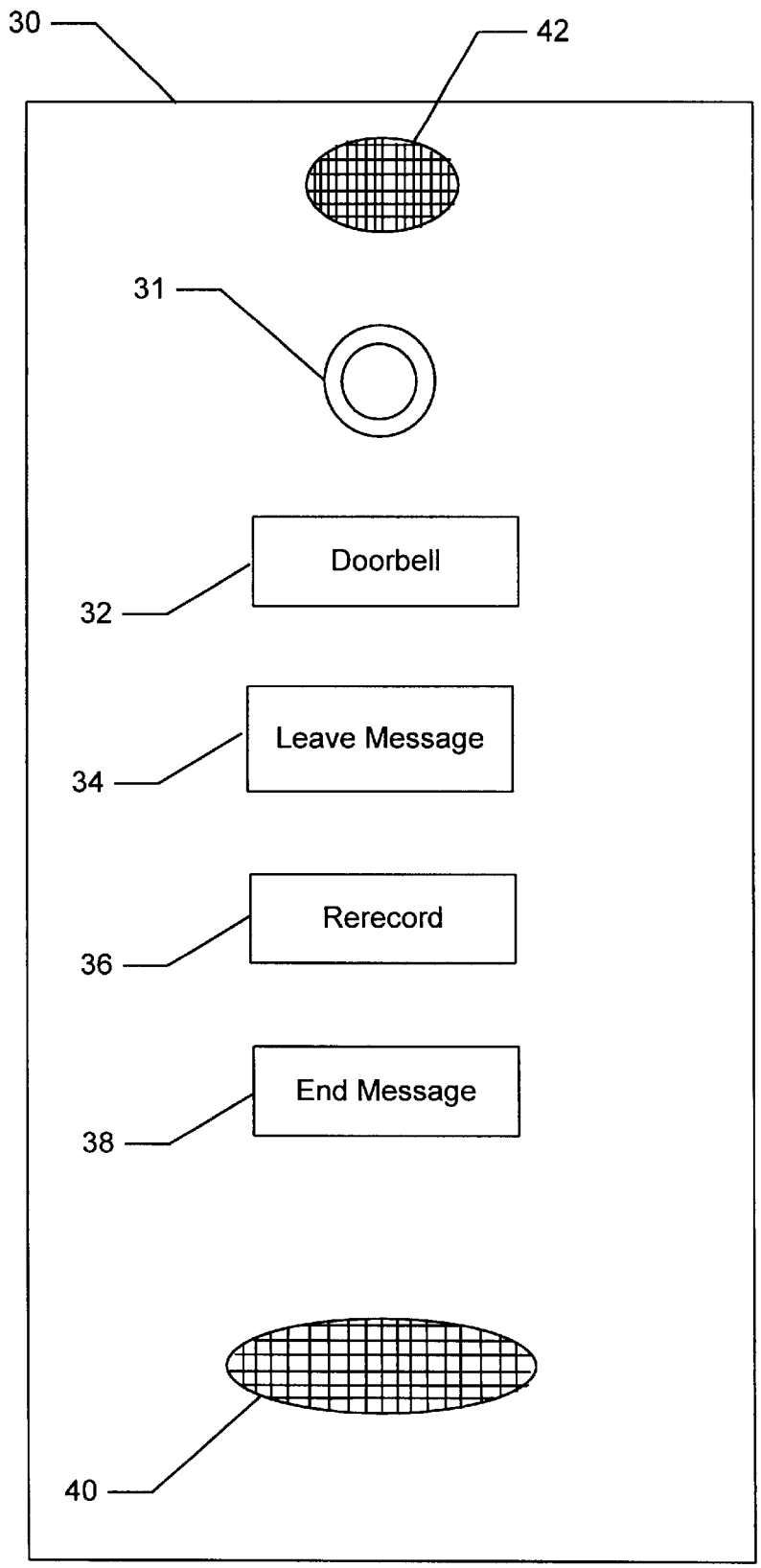
FIG. 2 discloses a front view of the visitor interface.

Disclosed in FIG. 2 is a front view of a visitor interface which may be employed as part of the messaging system described herein. The device may be located on the exterior and include a doorbell or be located proximate to one. With regards to an apartment building or business, the visitor interface may be located at a main entrance proximate to a doorbell or intercom device employed to notify occupants that visitors are outside.

The visitor interface 30 may include a doorbell 32 which initiates the transmission of an audible signal to occupants that a visitor is outside. The leave message switch 34 activates the doorbell communication system upon actuation by the visitor. Once this button is depressed, the communications system 12 is activated and a telephonic connection is established. If the connection is to the voice messaging system, the greeting left by the occupant on the system will be broadcast through the speaker 40. At the completion of the message, the visitor may then leave a message by speaking into microphone 42. The system is designed such that the speaker and microphone may be employed in full duplex mode.

If after recording the message, the visitor wishes to change the message, the rerecord button may be selected and when indication is provided via an audible message through the speaker, the visitor may then rerecord a message for the occupant. When the system user is then satisfied with the message which has been left, the end-message button 38 may be actuated which terminates the telephonic connection. One skilled in the art would realize that the visitor interface may be modified in a number of ways and additional functions added in order to enhance the services provided by the visitor messaging system.

Figure 3:
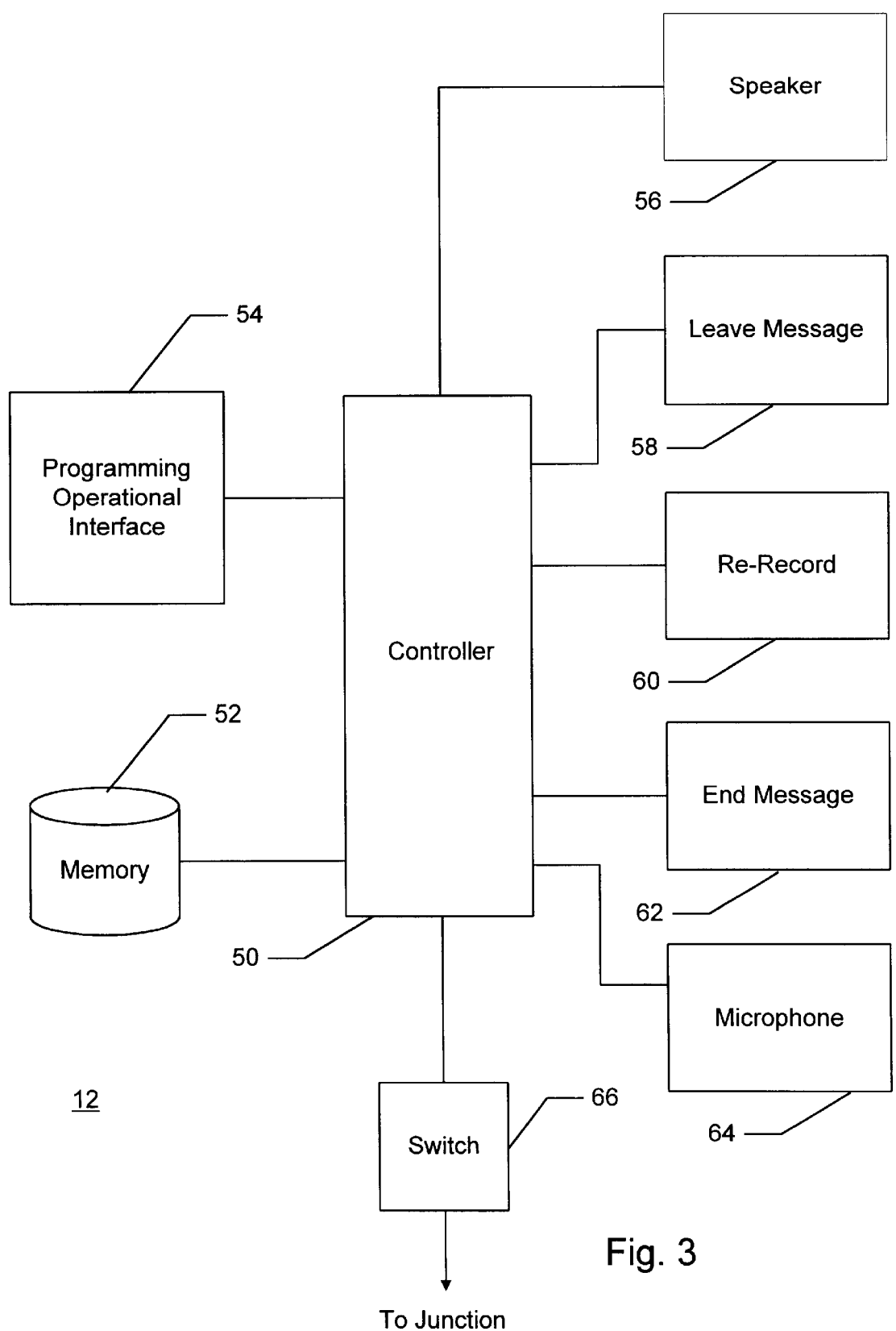
FIG. 3 discloses a system diagram for the visitor messaging system.

Disclosed in FIG. 3 is a system diagram for the communications system 12 which includes in particular the connections to the components previously disclosed as part of the visitor interface. The system includes a controller 50 which may be a microprocessor programmed to coordinate the various functions of the messaging system. In connection with the controller are the various interface buttons which were previously described as part of the visitor interface. They include the leave message button 58, the rerecord function 60 and message function 62. The controller also provides for the processing of various audio signals which may either be received through the microphone 64 or transmitted to the visitor via speaker 56. The controller connects to the telephone network through interface switch 66. Through activation of switch 66, the telephone line goes off-hook and the controller includes the functionality to dial and establish a telephonic connection using a preprogrammed telephone number.

The memory 52 includes the information employed by the controller 50 during operations. This information may include the telephone numbers used to establish a telephonic connection. Also in connection with the controller is the program/operational interface 54 which provides the functionality for an occupant/system user to program in operational information, such as telephone numbers to be employed when establishing a telephonic connection. This interface also provides the ability to activate and deactivate the system.

The program/operational interface 54 may be positioned in a variety of different locations. If the control system is a remotely located base station the program/operational interface may be incorporated therein. It is desirable to the program/operational interface located remote from the visitor interface to avoid providing unauthorized access to the telephone line.

In operation, a visitor would initially try to notify an occupant that they have arrived through use of a conventional notification means such as a doorbell or a knock on the door. When this proves unsuccessful, the visitor would then depress the leave message button. This selection will be detected by controller 50 which will then access the preprogrammed telephone number to establish a telephonic connection through switch 66. In one aspect of the invention, the occupant employs a voice messaging system, and the telephone number to access this system is programmed into the communications system. The controller dials this number and attempts to establish a telephonic connection. Because the controller is dialing the same number as the telephone line it is using, the telephone network will detect a busy signal, and as such will forward the call to the occupant's voice messaging system. Once this has occurred, the voice messaging system will play the occupant's greeting which the controller will route to the speaker. At the completion of the greeting, the visitor may leave a message.

The audio message left by the visitor will be transmitted via the telephonic connection through controller 50 to the voice messaging system. If for some reason during the recording of a message the visitor wishes to rerecord the same, the rerecord button 60 may be selected which signals the controller to transmit a DTMF signal via the telephonic connection which signals the voice messaging system to restart the recording process. When appropriate audio notice is provided, the visitor may then resume speaking into the microphone.

Upon completion of the recording of a message, the visitor may select the end-message button which signals the controller 50 to terminate the telephonic connection. At this point, the message provided by the visitor is stored in the voice messaging system which may then be accessed by the occupant through the placement of a call to the voice messaging system and entry of the appropriate codes.

In another aspect of the invention, the occupant may wish to establish a connection with a telephone rather than the voice messaging system. For example, an occupant may want to know immediately when a visitor is seeking to contact them, and as such, may program a forwarding telephone number into the communication system which establish a telephonic connection with a cellular phone, a land line phone, or a paging system which will provide immediate notification to the occupant. If a telephonic connection is established to another telephone, the party which answers the telephone may communicate with the visitor through use of the speaker and microphone incorporated into the visitor interface. Therefore, instead of recording the message, a direct line of communication is established between the parties. Further, if the forwarding number reaches a paging service, the visitor may be directed to select the rerecord button or leave a message with a human operator which notifies the occupant that someone is visiting their residence or business.

The forwarding function may also be employed to direct calls which are not answered to a phone of person who may be able to assist the party visiting the building. For example if a person is attempting to gain entry to a secure office or apartment building, and the person who is to receive the visit is not present, the call may be forwarded to a security guard or receptionist who may then speak with the visitor and provide additional assistance.

Figure 4A:
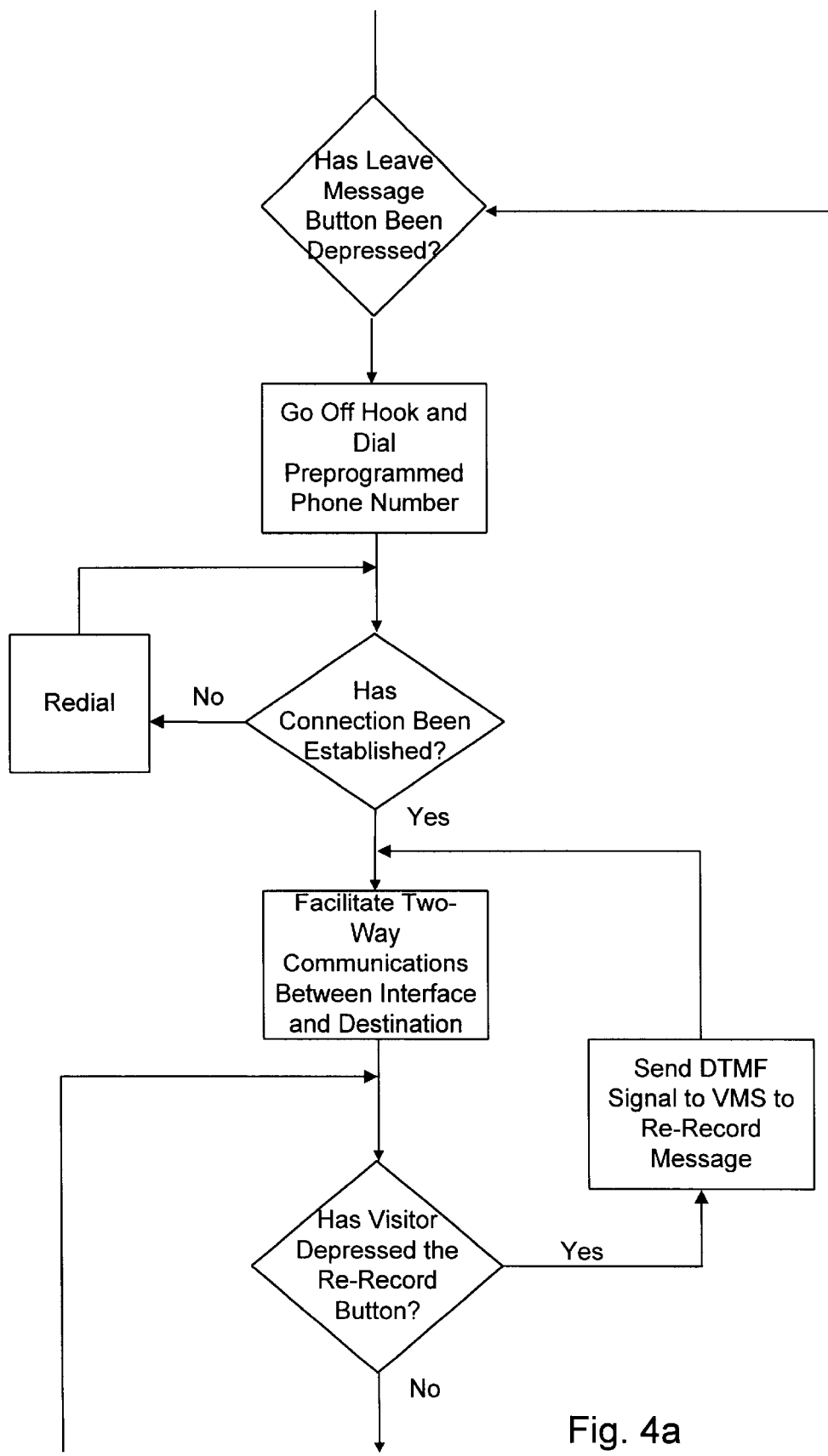
FIG. 4 discloses a flow chart which describes in detail the operation of the visitor messaging system.
Figure 4B:
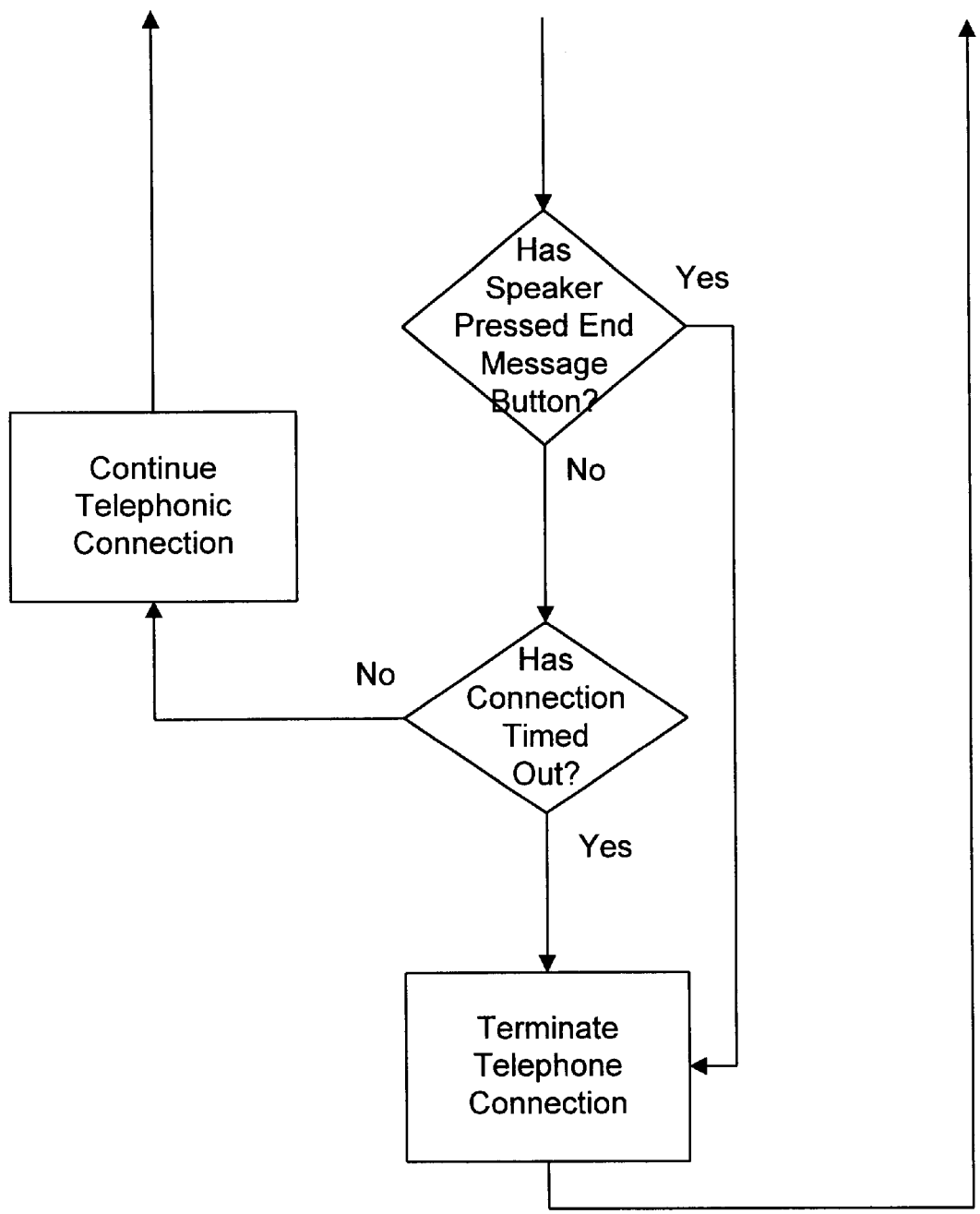

Disclosed in FIG. 4 is a flow diagram which describes in detail the steps performed by the controller when the system is activated by a visitor. Initially, if the messaging system has not been activated, the controller monitors for the activation of the leave-message button. When this switch is activated, the controller will take the telephone line off-hook and dial the telephone number which has been programmed into the messaging system. Upon completion of dialing, the controller will monitor when a connection has been established. If after a predetermined time the connection is not established, the controller will initiate a redial.

Once a connection is established, the controller facilitates two-way communications between the visitor interface and the destination (voice messaging system). As the visitor begins to speak, the controller monitors for the depression of the rerecord button. If the controller detects the depression of the rerecord button, a DTMF signal is transmitted via the telephonic connection and if a voice messaging system is the destination, the recording is started again.

The controller also monitors whether the speaker has depressed the end-message button. At the detection of this, the controller will terminate the telephonic connection. The controller may also employ a timeout feature which establishes a maximum amount of time for which a telephonic connection may be established. This feature is especially advantageous in situations where the voice messaging system is employed. This feature may be deactivated in the situations where the controller or the voice messaging system forwards the telephone call to a telephone number provided by the occupant. The controller will continually monitor the broadcast until the connection times out. Once the connection does time out, the telephonic connection is terminated.

Figure 5:
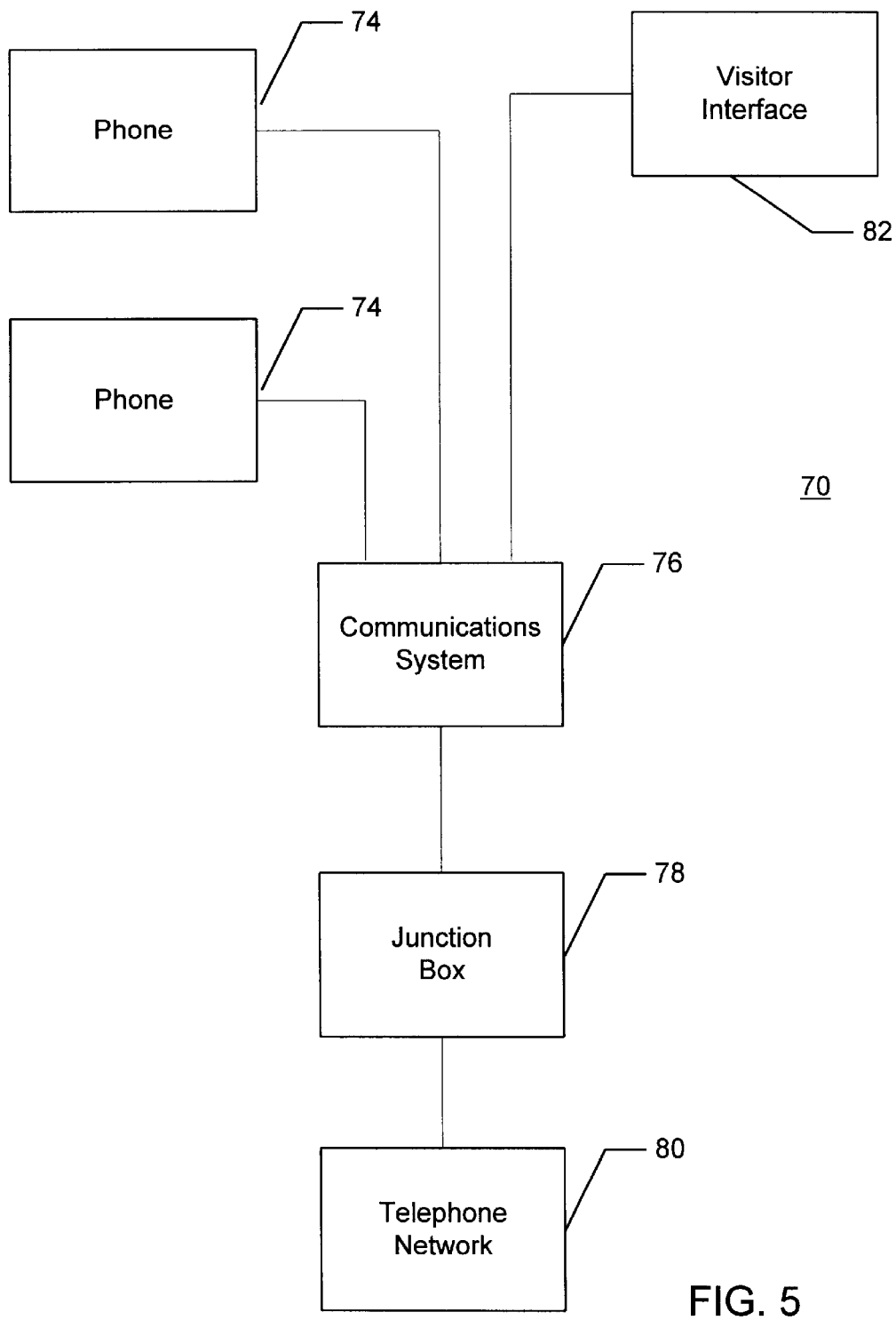
FIG. 5 discloses an alternate embodiment of the visitor messaging system.

Disclosed in FIG. 5 is an alternate embodiment for the invention described herein which provides functionality to establish an intercom between the visitor interface and the telephones connected to the local circuit. In this embodiment, the telephones employed within the building are all routed through the communication system which in turn is connected to the telephone network via a junction switch. As described above, a connecting is also established to the visitor interface.

Figure 6:
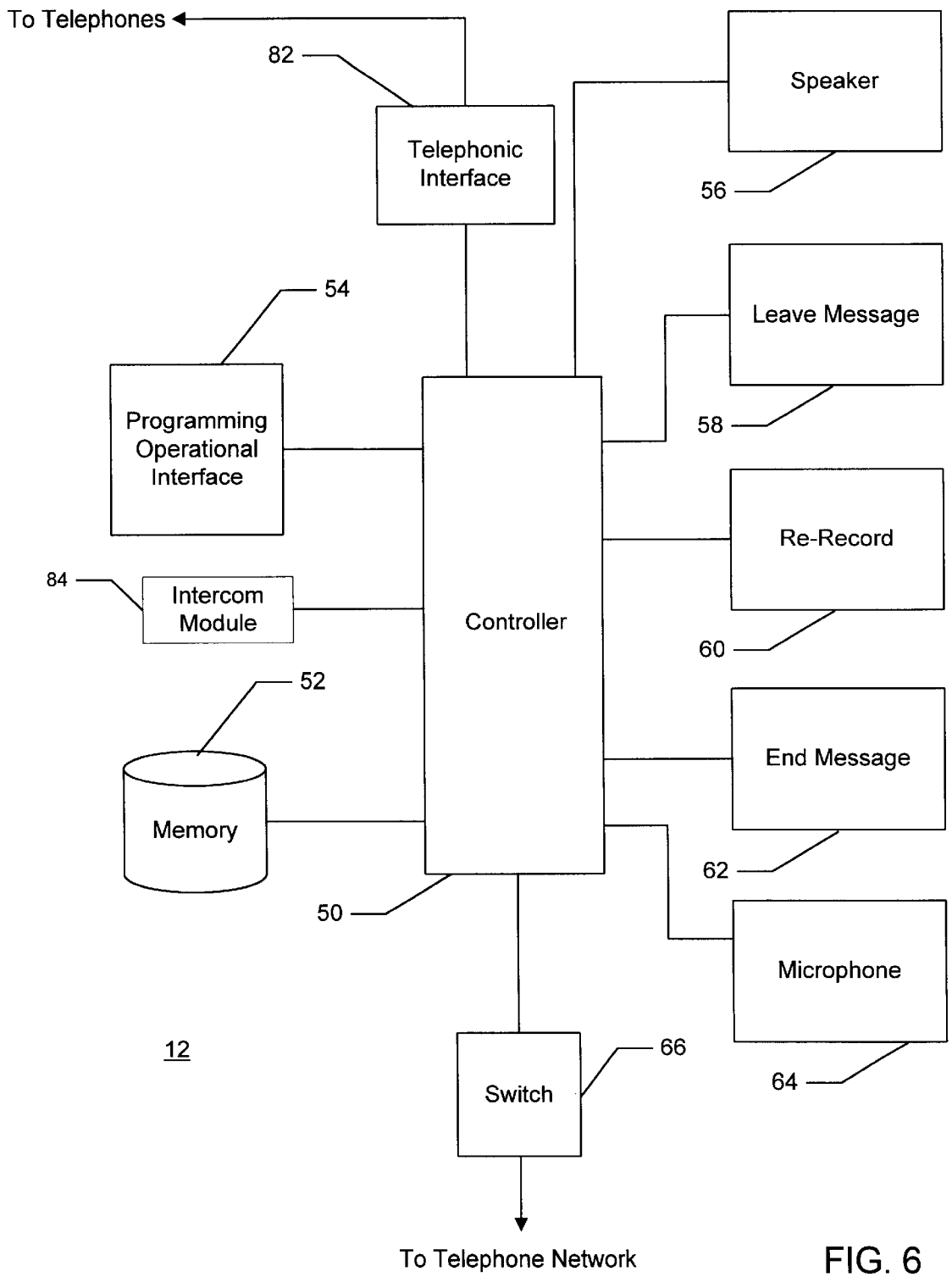
FIG. 6 discloses the configuration of the communication system in the alternate embodiment.

Disclosed in FIG. 6 is a system diagram for the communication system. As can be seen, an addition has been made to the system described previously. A telephonic interface 82 is provided between the controller and the telephones connected to the local circuit. Also incorporated into the controller is an intercom module 84 which provides the capability to establish an audio connection between the visitor interface and the telephones on the same telephone line.

Further functionality which may be incorporated therein is a call waiting feature which provides an audible tone to the telephones on the same line which are in use when a visitor depresses the leave-message button. If the user of the telephone engages the flash function, a line of communication may be established between the visitor outside the building and the user of the telephone. If the telephones are not currently being employed, they may ring for a predetermined number of times. If no answer is received, the communication system may route the call to the voice messaging system and the processes which were described above are then performed. Alternatively, the call may be forwarded to a predetermined phone number provided by the system user. If the occupant does answer the telephone, an intercom-like line of communication may then be established between the visitor at the visitor interface and the telephone which has been answered.

In another embodiment of the invention, the door bell system may employ a separate telephone line from the main line connected to the telephones in the building. When programming the system, the telephone number for the main line may be used to establish a connection. When a visitor activates the system, the phones in the building will ring, and if they go unanswered, the call will either be directed to the voice messaging system, picked up by an answering machine, or forwarded to a selected telephone number. If the main telephone line is in use, and employs call waiting features, the occupant, upon hearing the call waiting tone, may switch over to the incoming call from the visitor interface and talk directly to that party.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A doorbell system for recording messages from visitors comprising:
    an interface device positioned proximate to a doorbell which includes at least one activation switch and an apparatus for receiving audio information;
    an apparatus for directing audio information, remotely located from the interface device and inaccessible by a visitor, in connection with the interface device and a junction switch, which upon selection of the at least one activation switch, automatically dials a predetermined telephone number, establishes a telephonic connection with a predetermined destination, and further provides for transmission of audio information received to the destination, and upon further selection of the at least one activation switch, terminating the telephonic connection through said junction switch; and
    at least one interface connectable to the apparatus and positionable remote from the interface device which is configurable to provide functionality for programming operational information employable by the apparatus in directing the audio information.

2. The system of claim 1 wherein the interface device includes at least one of: a switch for activating the apparatus for directing audio, a re-record button for erasing a previous audio message and beginning a new audio message, and a switch for terminating the telephonic connection.

3. The system of claim 1 wherein the apparatus for receiving audio information is a microphone.

4. The system of claim 3 wherein the interface apparatus further includes an audio speaker for transmitting audio received as a result of the audio connection.

5. The system of claim 4 wherein the speaker and the microphone operate in full duplex mode.

6. The system of claim 1 wherein the system is incorporated as an extension in a phone system for a structure.

7. The system of claim 1 wherein the destination location is a preprogrammed telephoned number included as part of the operational information.

8. The system of claim 7 wherein the destination location is a voice messaging system.

9. The system of claim 1 wherein the system further includes a user interface for entering destination telephone numbers for establishing the telephonic connection.

10. The system of claim 1 wherein at least one telephone is routed through the apparatus for directing audio messages, and said apparatus includes apparatus for setting up an intercom like line of communication to said at least one telephone.

11. The system of claim 10 wherein audio messages from the interface device are routed to the at least one telephone in call waiting type manner.

12. The system of claim 1 wherein doorbell is incorporated into the interface device.

13. The system of claim 1 wherein the number dialed automatically is the number of the telephone connection being employed, wherein the call is automatically routed the voice Messaging system.

14. The system of claim 1 wherein the apparatus for directing audio information is a remotely located base station.

15. The system of claim 1 wherein the apparatus for directing audio information is incorporated into a decentralized multi-appliance premises network.

16. The system of claim 1 wherein the connection between the interface device and the apparatus for directing audio information is established through a hard electrical connection.

17. The system of claim 1 wherein the connection between the interface device and the apparatus for directing audio information is established through use of wireless signals.

18. The system of claim 1 wherein the connection between the interface device and the apparatus for directing audio information is established through use of a device which directs electrical signals over power lines.

19. A method for recording messages from visitors comprising the steps of:
    providing a visitor interface which includes at least one user interface device located proximate to a notification device and a connection to telephone network;
    providing an apparatus configured to direct audio information, wherein the apparatus in communication with a junction switch is remotely located from the interface device and inaccessible by a visitor;

receiving operational information through an interface which is positionable remote from the at least one user interface;

detecting activation of the user interface and using the operational information to establish a telephonic connection with a predetermined voice Messaging service;

broadcasting an audio message received from the voice Messaging system;

transmitting an audio message received at the visitor interface to a predetermined location via the telephonic connection; and terminating the telephonic connection through said junction switch upon completion of the message from the visitor.

20. The method of claim 19 wherein the audio message from the visitor is rerecorded at the voice Messaging system upon indication from the visitor.

21. The method of claim 19 wherein a telephonic connection is established with a voice messaging system and the audio message is stored in memory.

22. The method of claim 19 wherein the telephonic connection is established employing a predetermined phone number entered as part of the operational information.

23. The method of claim 19 wherein the interface device is located proximate to a doorbell.

24. The method of claim 19 further wherein the step of providing a telephonic connection includes establishing a two-way line of communication between the interface device and a remotely located telephone.

25. A doorbell system for recording messages from visitors, the system comprising:

a visitor interface device positioned proximate to a doorbell which includes at least one activation switch and an apparatus for receiving visitor input; and a communication controller device located remotely from the visitor interface, in communication with the visitor interface device and a junction switch, which upon selection of the at least one activation switch is operable to automatically establish communication between the visitor interface and a predetermined destination, and upon further selection of the at least one activation switch, operable to terminate the communication through said junction switch.

26. The system of claim 25 wherein the visitor input comprises audio information.

27. The system of claim 25 wherein the system further comprises a program/operation interface connectable to the communication controller device and configurable to provide functionality for programming operational information employable by the communication controller device.

* * * * *